United States Patent Office 3,280,631
Patented Oct. 25, 1966

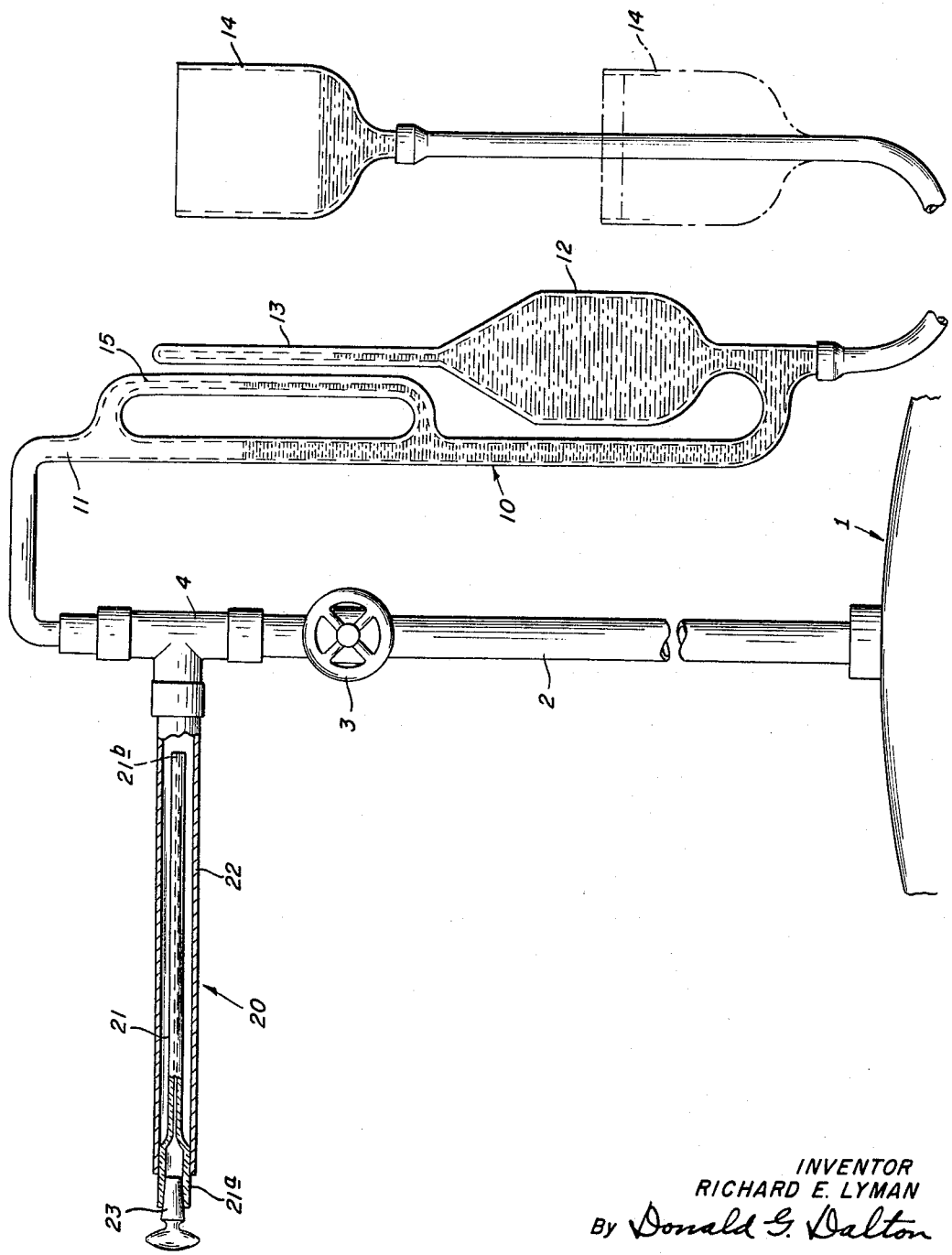

---

3,280,631
VACUUM GAGE ASSEMBLY
Richard E. Lyman, Homewood, Ill., assignor to United States Steel Corporation, a corporation of Delaware
Filed June 26, 1964, Ser. No. 378,341
1 Claim. (Cl. 73—400)

This invention relates to pressure measuring equipment especially suitable for control testing of the vacuum-chamber pressure in vacuum metallurgical processes, such as vacuum arc melting and vacuum carbon deoxidation.

In metallurgical processes of this type it is necessary to achieve accurate vacuum measurement so that the vacuum chamber pressure may be closely controlled. However, this is difficult to achieve with presently used vacuum gages, employing a manometer of the type which compresses a gas sample until its pressure reaches a measurable value, since the gases in the vacuum chambers of the foregoing processes contain varying amounts of components which condense upon compression, such as water vapor, which condensibles lead to spurious pressure readings.

The present invention provides means for obtaining an indication of the effect of condensibles on the gage readings so that the readings may be correspondingly corrected to obtain the true pressure in the vacuum chamber, reflecting the total pressure due to condensibles and non-condensibles alike.

Also, the invention provides equipment for nullifying the effect of condensibles on gage readings by interposing a non-condensible gas between the metallurgical vacuum chamber and the gage, whereby only non-condensible gas is subjected to compression within the manometer.

These and other advantages of the invention will become more apparent by reference to the drawing, showing an elevation view, partly in section and schematic in parts.

Metallurgical vacuum chamber 1 has outlet tube 2 connected thereto, which tube desirable contains shut-off valve 3. Beyond valve 3 is T-connection 4 with one leg connected to vacuum gage 10.

Gage 10 is of typical McLeod type, having sample inlet tube 11 connected with bulb 12 carrying capillary tube 13 into which the gas sample, filling bulb 12, is compressed sufficiently to permit manometric observation. The compression is accomplished by introducing mercury into bulb 12 from reservoir 14 which is flexibly connected thereto, to permit raising and lower thereof to vary the mercury level in bulb 12 and capillary 13. Capillary side arm 15 facilitates the manometric readings, which are based, in conventional manner, on comparison of the heights of the mercury columns in capillary tubes 13 and 15.

With the exception of the T-connection, the foregoing represents a conventional arrangement. The present invention is characterized by the introduction of fixed-leak assembly 20 comprising flow-limiting capillary tube 21 housed in tube 22, which latter is connected to the remaining leg of T-connection 4. The capillary tube has enlarged outer end 21a which is sealed inside tube 22. Enlarged end 21a is exposed to the atmosphere and is fitted with removable vacuum-tight stopper 23. Capillary tube end 21b affords discharge into the T-connection and the remainder of the system.

During normal operation, valve 3 is open, permitting gas in the vacuum chamber 1 to flow into gage 10. When conventional measurements are desired, stopper 23, is in place to prevent flow of atmospheric air into capillary tube 21.

With a gage of the type described, accurate readings are obtainable with non-condensible gases, such as hydrogen, nitrogen, etc., which obey the permanent gas law for pressure changes with changes in volume. However, a readily condensible gas, such as water vapor, will, upon compression, simply condense into an infinitesimal volume in the capillary above the bulb, giving no appreciable depression of the mercury below that in the arm open to the vacuum source.

If it is desired to check the accuracy of the vacuum measurements of the gage, as influence by condensibles, stopper 23 is removed to open the end of capillary tube 21 to admit air, which is comparatively free of condensibles. If there are no condensibles present in vacuum chamber 1, and affecting the vacuum measurement of the gage, the reading of the gage will vary in accordance with the pressure drop across the tube 21 which is known by previous calibration and is so slight as to be negligible in most applications. If a greater difference in pressure readings is obtained, the difference will be that caused by condensibles within the vacuum chamber. Hence, the vacuum measurement may be corrected accordingly to provide an accurate determination.

If it is desired to obtain only readings of the total pressure in vacuum chamber 1, stopper 23 may be kept open continuously, with resultant purging of tube 2, and the creation of a continuing source of non-condensible gas for compression in gage 10. While there will be some pressure drop between T-connection 4 and vacuum chamber 1, this pressure differential is insignificant in the contemplated applications, and in any event may be calibrated and corrected for if desired. Also, the amount of air introduced through capillary 21 is so limited as to have no significant effect upon the gas content of the metallurgical process chamber. In general, minimum flow rates through capillary 21 are contemplated, consistent with providing a sufficient quantity of condensible-free gas for gage operation.

The volume of tube 2 is selected to be sufficient to permit it to fill bulb 12 of gage 10, and capillary 21 is selected to permit just sufficient rate of air entry into tube 2 to purge condensible laden gas from portions of the tube required for filling the bulb with non-condensibles. In an application of the invention, with a gage having a capacity of bulb 12 of about 150 cubic centimeters, a tube 2 of ⅜ inch inside diameter, 10 feet long, was employed.

Purging of gage 10 may be expedited by closing valve 3, with bulb 12 open for gas flow from inlet tube 11, whereupon with stopper 23 open, non-condensible gas is admitted to the gage. This may be compressed to promote mixing with residual gas in the gage, and exhausted from the gage by reopening valve 3.

While certain specific examples have been given, it will be understood that variations which may be made therein without departing from the spirit of the invention are contemplated within the scope of the claim.

I claim:
Means for the measurement of gas pressure in vacuum chambers of vacuum metallurgical processes and the like comprising a compression type gage, gas conducting means connecting said gage with said vacuum chamber, means for introducing non-condensible gas under a predetermined pressure and at limited flow rates at a point between said gage and said chamber, said gas conducting means having sufficient capacity between said point of gas introduction and said vacuum chamber to hold sufficient gas for gage operation, and said flow limiting means being so chosen as to provide minimum necessary amounts of non-condensible gas for purging the volume of gas conducting means required for gage operation.

References Cited by the Examiner

Bixler et al.: "Use of McLeod Gauges at Room Temperature for Gases With High Critical Temperatures," review of Scientific Instruments, vol. 31, No. 10, page 1155, October 1960.

LOUIS R. PRINCE, *Primary Examiner.*